US011960298B2

(12) United States Patent
Amini et al.

(10) Patent No.: US 11,960,298 B2
(45) Date of Patent: Apr. 16, 2024

(54) MULTI-RANGE VEHICLE SPEED PREDICTION USING VEHICLE CONNECTIVITY FOR ENHANCED ENERGY EFFICIENCY OF VEHICLES

(71) Applicant: THE REGENTS OF THE UNIVERSITY OF MICHIGAN, Ann Arbor, MI (US)

(72) Inventors: Mohammad Reza Amini, Ann Arbor, MI (US); Yiheng Feng, Ann Arbor, MI (US); Zhen Yang, Ann Arbor, MI (US); Ilya Kolmanovsky, Ann Arbor, MI (US); Jing Sun, Superior Township, MI (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 336 days.

(21) Appl. No.: 17/225,577

(22) Filed: Apr. 8, 2021

(65) Prior Publication Data
US 2021/0318691 A1    Oct. 14, 2021

Related U.S. Application Data

(60) Provisional application No. 63/007,670, filed on Apr. 9, 2020.

(51) Int. Cl.
*G05D 1/02* (2020.01)
*G05D 1/00* (2006.01)
*H04W 4/44* (2018.01)

(52) U.S. Cl.
CPC ......... *G05D 1/0278* (2013.01); *G05D 1/0221* (2013.01); *G05D 1/0223* (2013.01); *H04W 4/44* (2018.02)

(58) Field of Classification Search
CPC .. G05D 1/0278; G05D 1/0221; G05D 1/0223; H04W 4/44; H04W 4/029; Y02D 30/70; B60W 60/00
(Continued)

(56) References Cited

U.S. PATENT DOCUMENTS

2017/0316688 A1 * 11/2017 Lai ................. G01C 21/3492
2018/0364725 A1 * 12/2018 Lonari ............... B60W 10/06
2020/0089241 A1    3/2020 Kao et al.

OTHER PUBLICATIONS

Ye et al, Prediction-Based Eco-Approach and Departure at Signalized Intersections With Speed Forecasting on Preceding Vehicles, IEEE Transactions on Intelligent Transportation Systems, vol. 20, No. 4, Apr. 2019 (Year: 2019).*

(Continued)

*Primary Examiner* — Anne Marie Antonucci
*Assistant Examiner* — Jodi Marie Jones
(74) *Attorney, Agent, or Firm* — Harness, Dickey & Pierce, P.L.C.

(57) ABSTRACT

An integrated speed prediction framework based on historical traffic data mining and real-time V2I communications for CAVs. The present framework provides multi-horizon speed predictions with different fidelity over short and long horizons. The present multi-horizon speed prediction is integrated with an economic model predictive control (MPC) strategy for the battery thermal management (BTM) of connected and automated electric vehicles (EVs) as a case study. The simulation results over real-world urban driving cycles confirm the enhanced prediction performance of the present data mining strategy over long prediction horizons. Despite the uncertainty in long-range CAV speed predictions, the vehicle level simulation results show that 14% and 19% energy savings can be accumulated sequentially through eco-driving and BTM optimization (eco-cooling), (Continued)

respectively, when compared with normal-driving and conventional BTM strategy.

5 Claims, 9 Drawing Sheets

(58) Field of Classification Search
USPC ....... 701/23, 25, 50, 2, 408, 1, 26, 117, 469,
701/532, 300, 301, 468, 41, 533, 28, 24,
701/36, 400, 410, 472, 516, 517, 409,
701/470, 519, 27, 466, 423, 412, 467,
701/31.4, 70, 96, 411, 22, 522, 465, 426,
701/414, 438, 119, 454, 500, 93, 82, 514,
701/428, 526, 3, 420, 484, 424, 431, 491,
701/118, 120, 521, 32.3, 32.4, 461, 537,
701/538, 29.1, 42, 450, 451, 425, 45,
701/29.3, 33.4, 445, 487, 31.5, 434, 523,
701/422, 439, 49, 116, 121, 29.6, 486,
701/527, 541, 462, 48, 540, 98, 19, 416,
701/448, 455, 495, 32.2, 433, 485, 20,
701/34.4, 4, 40, 417, 436, 442, 446, 46,
701/47, 51, 520, 79, 11, 21, 413, 415,
701/437, 453, 490, 498, 508, 518, 524, 7,
701/80, 99, 103, 122, 29.2, 29.5, 32.5,
701/33.2, 4.3, 483, 52, 530, 59, 65, 69,
701/84, 89, 102, 123, 29.4, 30.6, 31.9,
701/32.1, 43, 503, 531, 534, 539, 67, 83,
701/100, 113, 124, 13, 15, 16, 29.9, 30.1,
701/30.2, 30.3, 30.9, 31.1, 38, 435, 441,
701/452, 460, 478, 5, 512, 53, 56, 68, 71,
701/72, 75, 87, 88, 110, 30.8, 32.8, 32.9,
701/33.7, 33.9, 421, 54, 91
See application file for complete search history.

(56) References Cited

OTHER PUBLICATIONS

"Stochastic MPC With Learning for Driver-Predictive Vehicle Control and its Application to HEV Energy Management", Stefano Di Cairano et al., IEEE Transactions on Control Systems Technology, vol. 22, No. 3, May 2014.
"Dynamic Traffic Feedback Data Enabled Energy Management in Plug-in Hybrid Electric Vehicles", Chao Sun et al. IEEE Transactions on Control Systems Technology, vol. 23, No. 3, May 2015.
"Eco-Trajectory Planning with Consideration of Queue along Congested Corridor for Hybrid Electric Vehicles", Zhen Yang et al., Transportation Research Record, May 7, 2019.

* cited by examiner

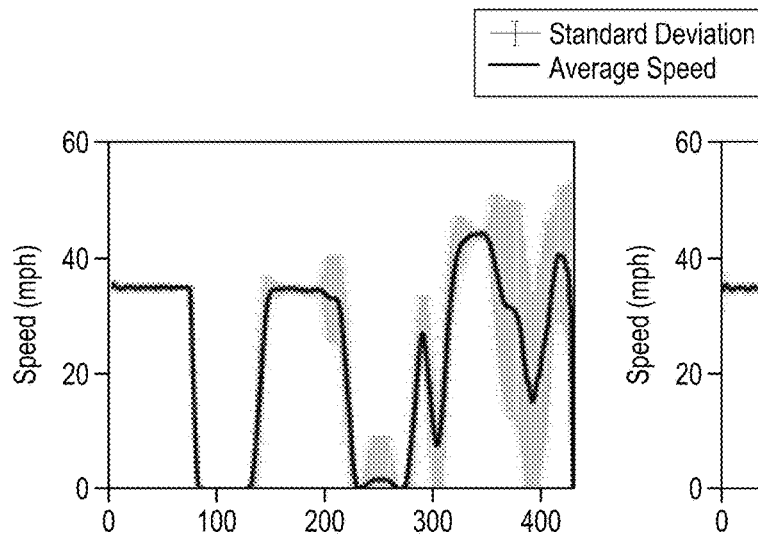
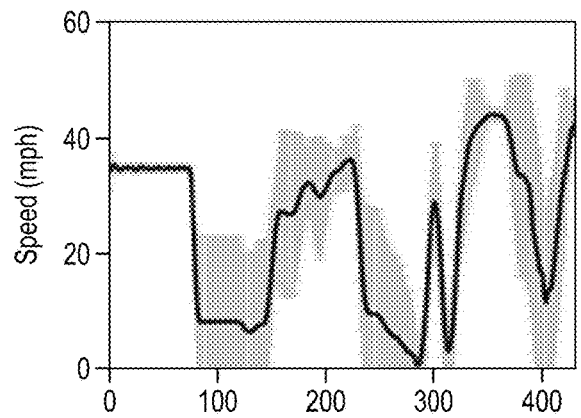
FIG. 3A
FIG. 3B
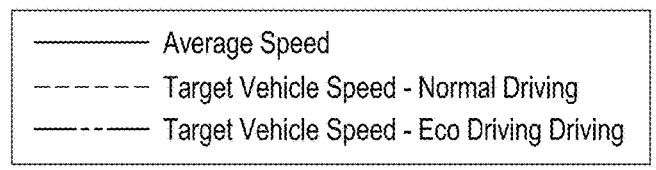
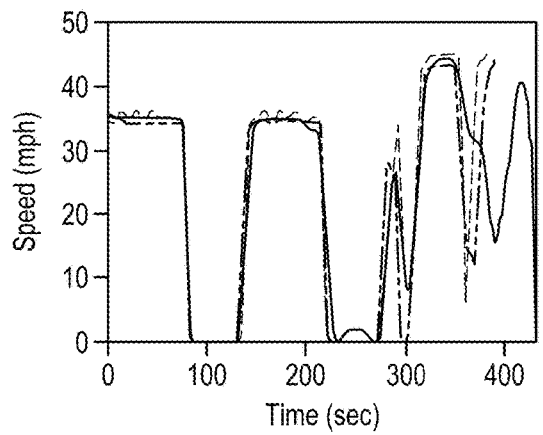
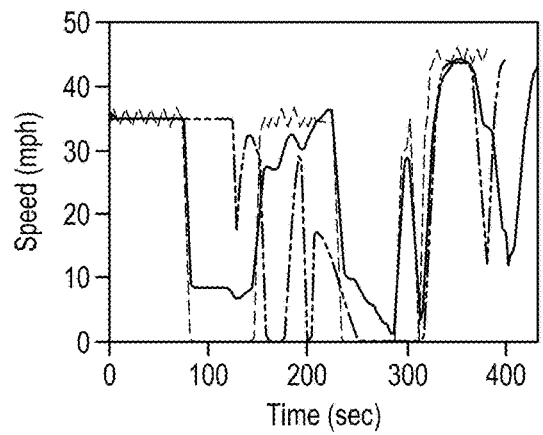
FIG. 3C
FIG. 3D

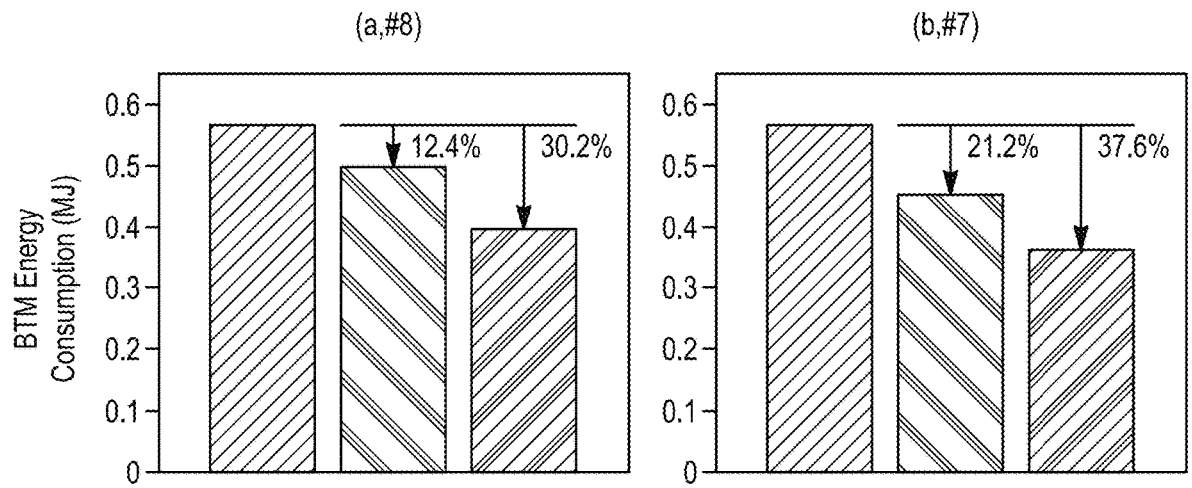
FIG. 5A
FIG. 5B
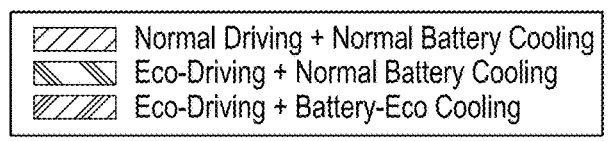
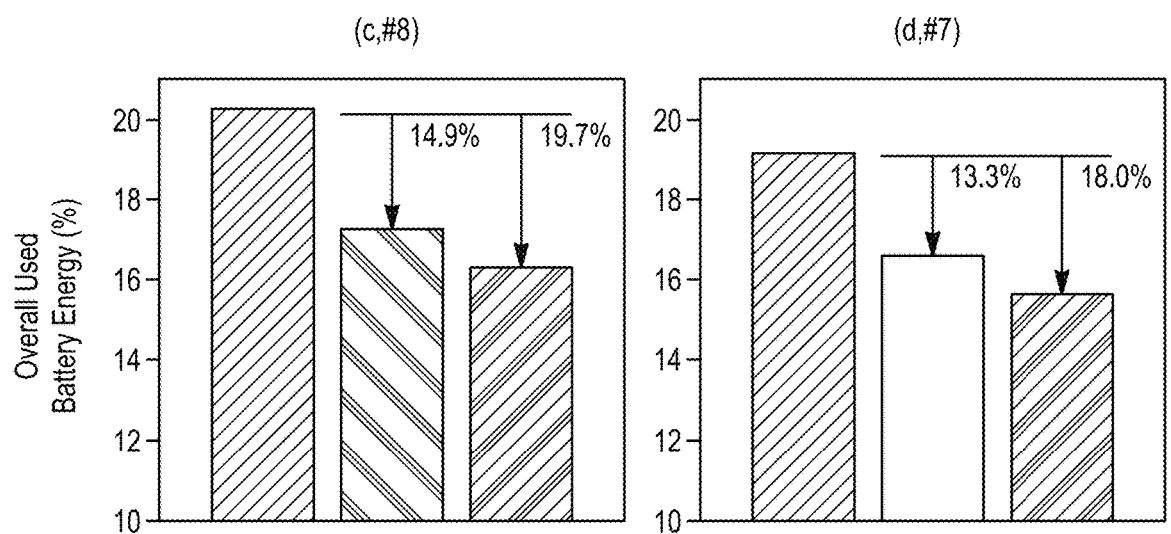
FIG. 5C
FIG. 5D

MULTI-RANGE VEHICLE SPEED PREDICTION USING VEHICLE CONNECTIVITY FOR ENHANCED ENERGY EFFICIENCY OF VEHICLES

CROSS-REFERENCE TO RELATED APPLICATIONS

This application claims the benefit of U.S. Provisional Application No. 63/007,670, filed on Apr. 9, 2020. The entire disclosure of the above application is incorporated herein by reference.

GOVERNMENT SUPPORT

This invention was made with government support under DE-AR0000797 awarded by the United States Department of Energy. The government has certain rights in this invention.

FIELD

The present disclosure relates to predictive modeling and, more particularly, to a multi-range vehicle speed prediction using vehicle connectivity and historic traffic data for enhanced energy efficiency of conventional and electrified vehicles.

BACKGROUND AND SUMMARY

This section provides background information related to the present disclosure which is not necessarily prior art. This section provides a general summary of the disclosure, and is not a comprehensive disclosure of its full scope or all of its features.

In addition to enhancing safety and mobility, connected and automated vehicles (CAVs) can exploit vehicle speed prediction and planning to improve the energy efficiency of the individual vehicle, as well as the traffic network. While abundant evidence has been accumulated showing substantial energy-saving potential of the CAVs by up to 20%, uncertainties associated with real-world vehicle speed forecast in traffic consisting of human-driven and automated vehicles can degrade these benefits. This is because most of the CAV technologies, such as eco-driving, platooning, cooperative adaptive cruise control, and energy management, rely on look-ahead information in the form of vehicle speed and power and thermal load profiles. When evaluating the energy-efficiency of CAVs, this look-ahead information has been assumed either known a priori for a given driving cycle or available over a short-range.

Moreover, the thermal management efficiency of the electric battery, cabin air, engine, and exhaust after-treatment system can have a significant impact on the overall energy efficiency of vehicles, electrified vehicles, and CAVs in particular. For electrified CAVs and electric vehicles (EVs), in particular, efficient thermal management of the electric battery is a significant factor in the overall vehicle energy consumption optimization. For EVs with relatively large battery packs, the electric battery is the only source of power to satisfy the driving demand, i.e., traction power, and auxiliary loads, including those for powering the electric compressor of the air conditioning (A/C) system. In typical EVs, the battery thermal management (BTM) system rejects the generated heat from the battery to the refrigerant of the A/C cooling loop. Hence, the operation of the BTM system introduces extra load on the battery. As it has been reported in the literature, the BTM and NC systems can consume a substantial amount of energy in hot weather, and reduce the EV driving range by 50%. Therefore, optimization of the BTM system operation is essential for improving the overall energy efficiency of EVs.

The thermal dynamics (i.e., temperatures) of vehicular systems have relatively slow dynamics, as compared to electrical current/voltage and mechanical dynamics. Thus, a relatively long time horizon and long-term vehicle speed forecasts are required for the optimization of the thermal responses and their energy-efficient operation. To be useful, the long-term vehicle speed forecasts need to be sufficiently accurate, which is difficult to achieve with the existing connectivity-based vehicle speed prediction approaches, particularly in mixed urban driving environments with human drivers.

Eco-driving at signalized intersections typically involves eco-arrival and eco-departure (EAD), where trajectories of one or more vehicles are optimized given the traffic signal timing by controlling, or through the advisory of, vehicle speeds with the purpose of reducing energy consumption. EAD studies can be classified into several categories based on the number of vehicles considered in the model, the number of intersections, whether surrounding traffic is considered, and the solution method. Most of the previous studies have addressed one vehicle approaching/departing one intersection without consideration of surrounding vehicles. Some other studies have considered multiple intersections, but they treated each intersection independently when planning vehicle speed trajectories.

The surrounding traffic has a considerable impact on the ego-vehicle trajectory. The development of EAD algorithms that account for traffic queuing dynamics at the intersections has been addressed. A parsimonious shooting heuristic (SH) algorithm has been proposed to construct the trajectories of all the vehicles in the traffic network with considerations of the vehicle kinematic limits, traffic arrival patterns, car-following safety, and signal operations. Almost all the EAD models, however, generate short-term vehicle trajectories (e.g., over a time interval of 30 sec to 60 sec in duration). Furthermore, only one or two closely spaced intersections are considered in these studies over the planning horizon. Other data-driven strategies provide only a short-range prediction of the vehicle speed using learning-based techniques, such as neural networks and Markov chain. On the other hand, while some studies have investigated long-term vehicle speed profile prediction, they have focused on predicting the average speed of the vehicle at the road segment level, or on estimating vehicle speed at a fixed location. Overall, high-resolution (e.g., second by second) long-term vehicle speed forecasting has not been sufficiently addressed. There exists a major gap in delivering reliable and adaptable speed predictions for CAVs, specifically in arterial corridors. Bridging this major gap not only allows for pushing the energy efficiency of CAVs to higher levels, but it also opens new opportunities for route optimization (eco-routing) and intelligent traffic signal control by providing a holistic view of the traffic network.

According to the principles of the present teachings, the present disclosure provides (i) a data-driven approach for long-range prediction of vehicle speed by leveraging the historical traffic data of CAVs, and (ii) integrating it with short-range, model-based, and more accurate speed predictions based on eco-trajectory planning algorithms. This enhances the vehicle speed preview and facilities the implementation of power and thermal management strategies for CAVs based on model predictive control (MPC) or any predictive optimization strategy, and the improvement of the overall energy efficiency of CAVs.

The present disclosure presents at least the following: First, a multi-range vehicle speed prediction framework is presented that is informed by historic traffic data for long-term prediction and by an eco-trajectory planning with consideration of queuing dynamics at signalized intersections for short-term prediction. Next, the predicted CAV speed trajectories can be exploited for MPC to improve BTM, or other power and thermal sub-systems (such as climate control system) of connected and automated EVs. This BTM controller design is followed by simulation results that illustrate the performance improvements during normal-driving and eco-driving scenarios.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations and are not intended to limit the scope of the present disclosure.

FIGS. 3A-3B illustrate the average and standard deviation of the "classified" speed profiles in bin 8 and 7. FIGS. 3C-3D illustrate the average speed profiles of bin 8 and 7 against the actual speed trajectories of two ego-vehicles randomly selected from these two bins, with and without eco-driving.

Figures 4A, 4B:
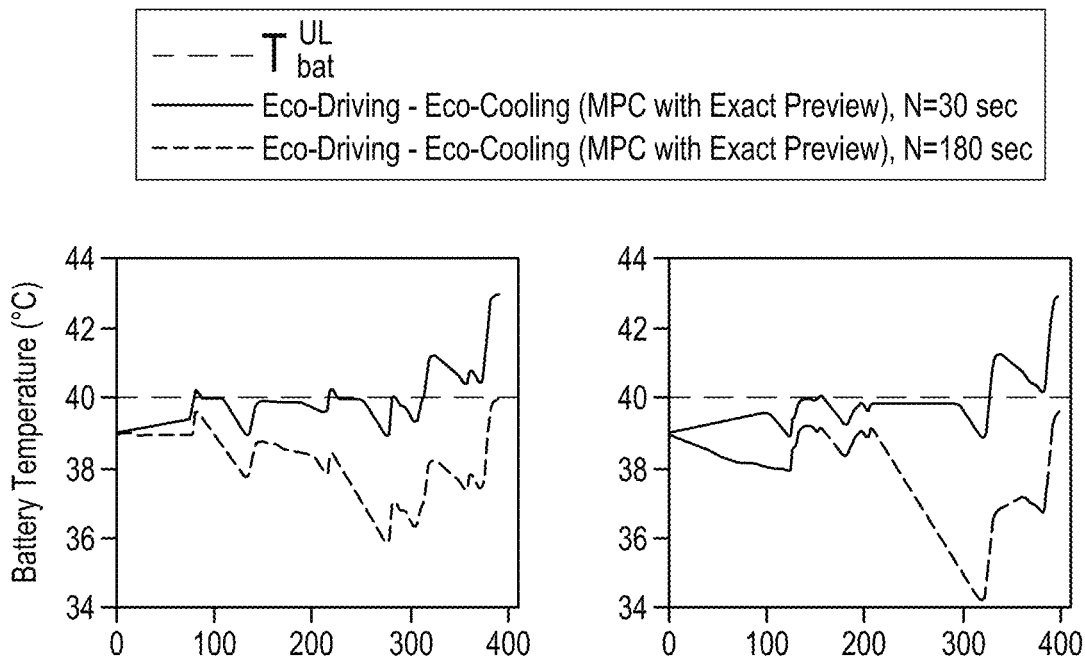
Figures 4C, 4D:
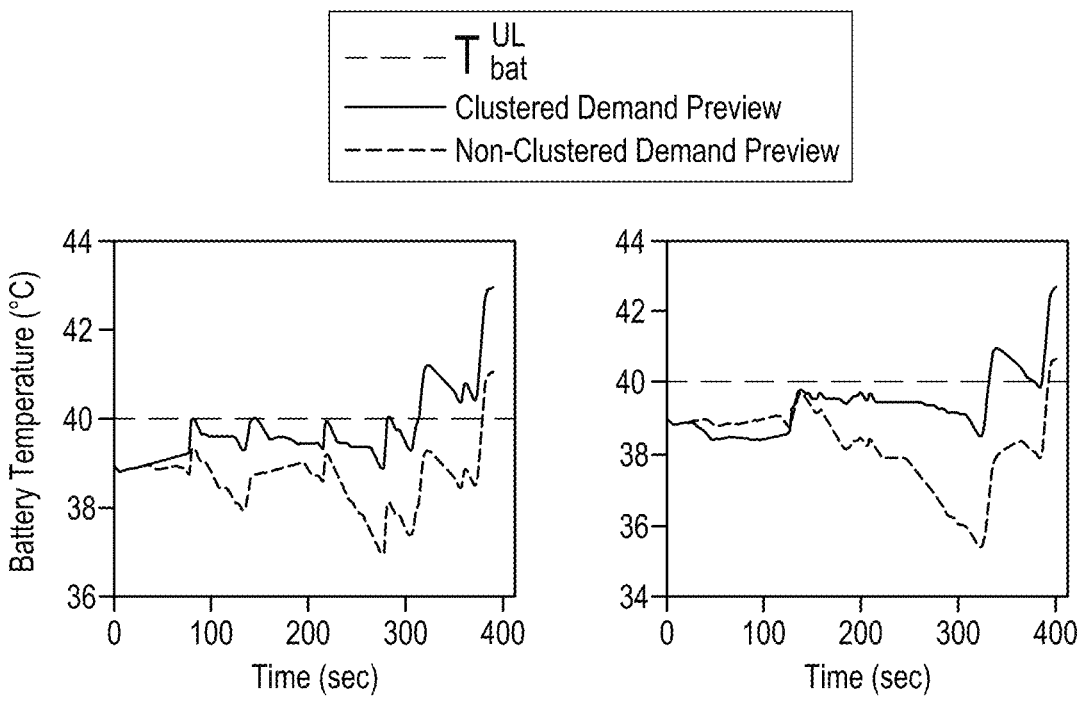

FIGS. 4A-4B illustrate the time histories of the battery temperature of an EV with the MPC for BTM in Eq. (2) for prediction horizons of N=30, 180 for the eco-vehicles. FIGS. 4C-4D show the MPC-based BTM results for N=180 with clustered (i.e., classified) and non-clustered speed previews for eco-vehicles in bin #8 and #7, respectively.

FIGS. 5A-5D illustrate BTM and vehicle-level energy-saving results through eco-driving and eco-cooling based on the long-range speed preview for the target vehicles from bin 8 and 7, respectively.

FIG. 6A-6D illustrate the time histories of the battery temperature and vehicle-level energy-saving results through eco-cooling (i.e., control the BTM system of EV using MPC) with exact and approximate (uncertain) speed previews for the target vehicles from bin 8 and 7, respectively.

Figure 7:
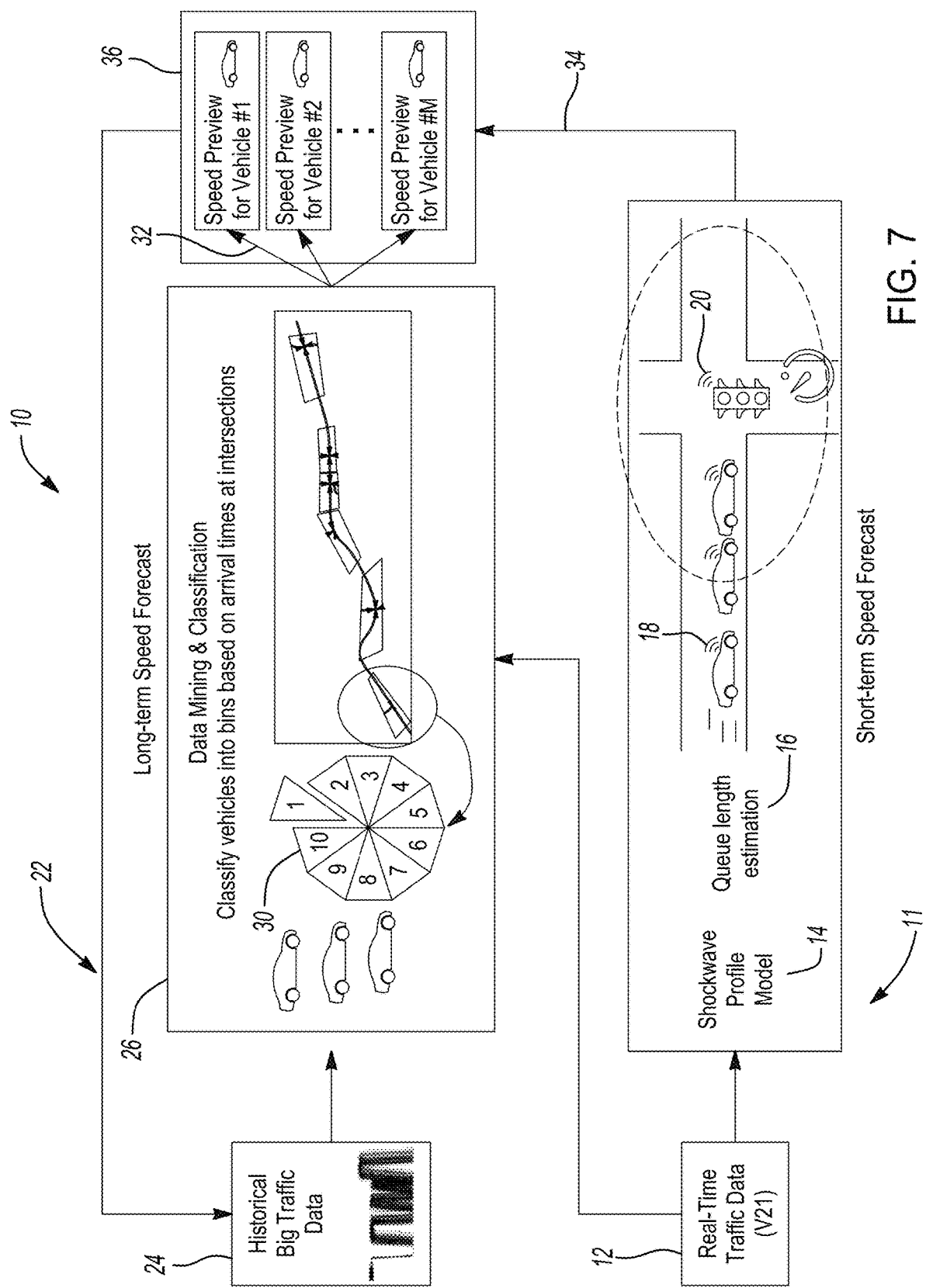

FIG. 7 is a schematic flow chart of the multi-range speed prediction strategy of the present teachings.

Figure 8:
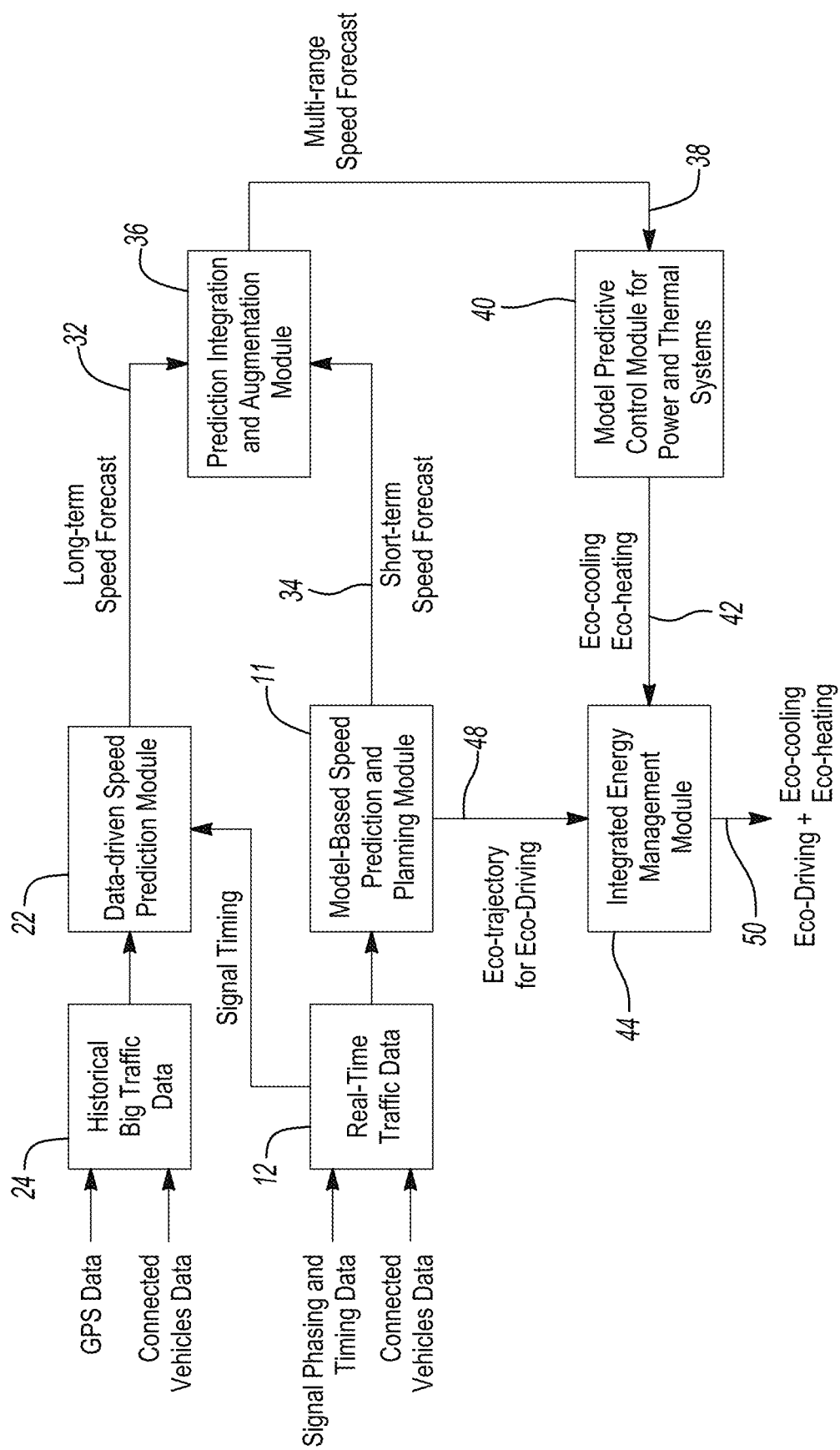

FIG. 8 is a schematic flow chart of the multi-range speed prediction strategy of the present teachings.

Figure 9:
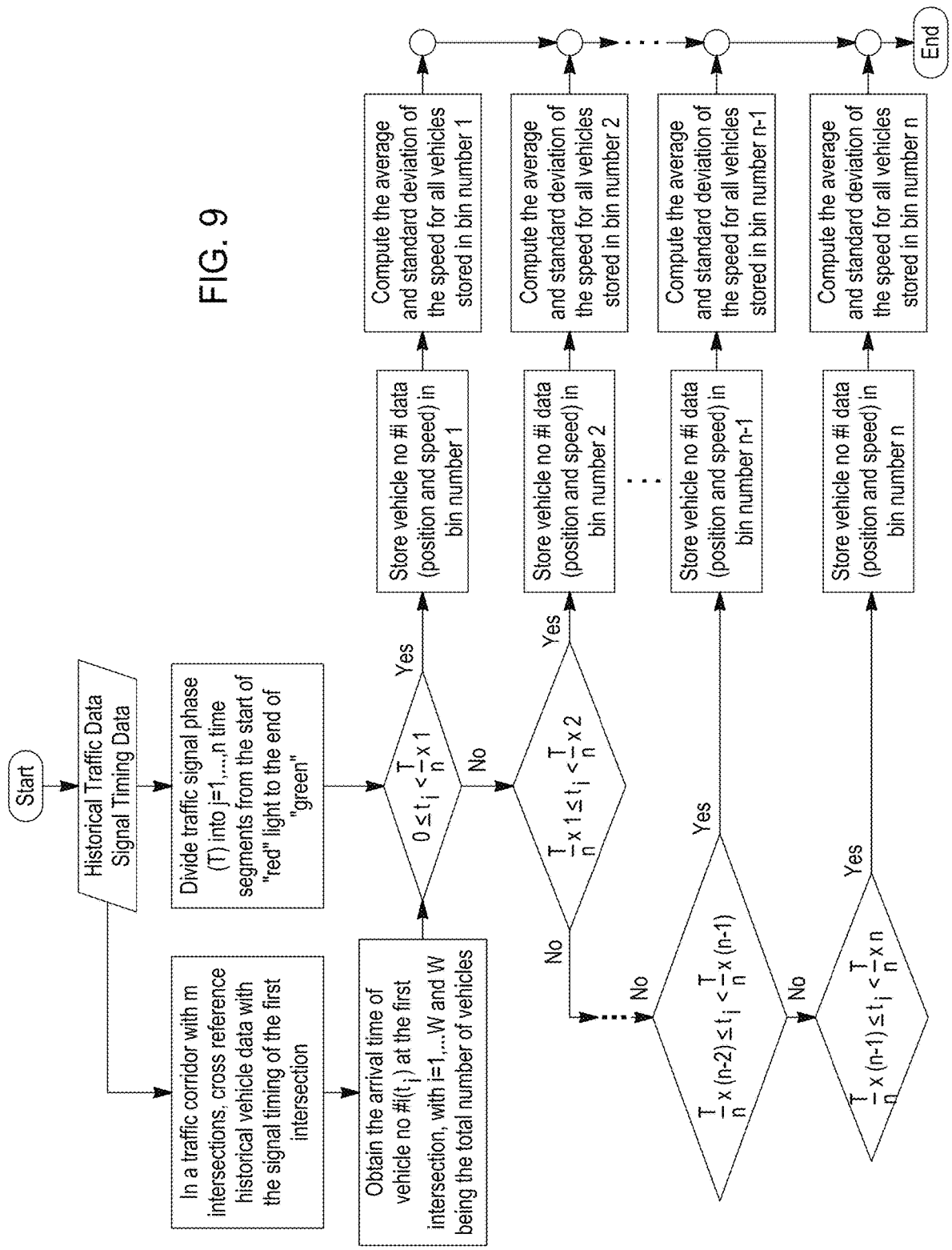

FIG. 9 is a computational flow chart of the present teachings.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Connected and automated vehicles (CAVs) are expected to provide enhanced safety, mobility, and energy efficiency. While abundant evidence has been accumulated showing substantial energy saving potentials of CAVs through eco-driving, traffic condition prediction has remained the main challenge in capitalizing on the gains. The coupled power and thermal subsystems (e.g., engine, battery, cooling/heating systems) of CAVs necessitate the use of different speed preview windows for effective and integrated power and thermal management. Real-time vehicle-to-infrastructure (V2I) communications can provide an accurate speed prediction over a short prediction horizon (e.g., 30 sec to 60 sec), but not for a long-range horizon (e.g., over 180 sec). Therefore, advanced approaches are required to develop detailed speed prediction for robust optimization-based energy management of CAVs.

This present disclosure presents an integrated speed prediction framework based on historic traffic data mining and real-time traffic data, such as V2I communications for electrified CAVs. In some embodiments, the present framework provides multi-horizon speed predictions with different fidelity over short and long horizons. In some embodiments, the present multi-horizon speed prediction is integrated with an economic model predictive control (MPC) strategy for battery thermal management (BTM) of connected and automated electric vehicles (EVs). The simulation results over real-world urban driving cycles presented herein confirm the enhanced prediction performance of the present data mining strategy over long prediction horizons. Despite the uncertainty in long-range CAV speed predictions, the vehicle level simulation results show that 14% and 19% energy savings can be accumulated sequentially through eco-driving and BTM optimization (eco-cooling), respectively, when compared with normal-driving and conventional BTM strategy.

Eco-Trajectory Planning for CAVs

In some embodiments, as seen in FIGS. 7-9, an eco-trajectory planning approach 10 that accounts for queuing dynamics at signalized intersections along a congested corridor is provided. In eco-trajectory planning approach 10, the eco-vehicle (i.e., an ego-vehicle that autonomously or by a human driver follows a planned eco-trajectory) receives traffic signal and queue length information via V2I communications 12 and generates a speed profile 14, including an estimation of the queue length 16, with the objective to minimize energy consumption. The queue length 16 is predicted based on the trajectories of connected vehicles inferred from Basic Safety Messages (BSMs) 18 and from loop-detectors 20 installed at the infrastructure side.

Figure 1:
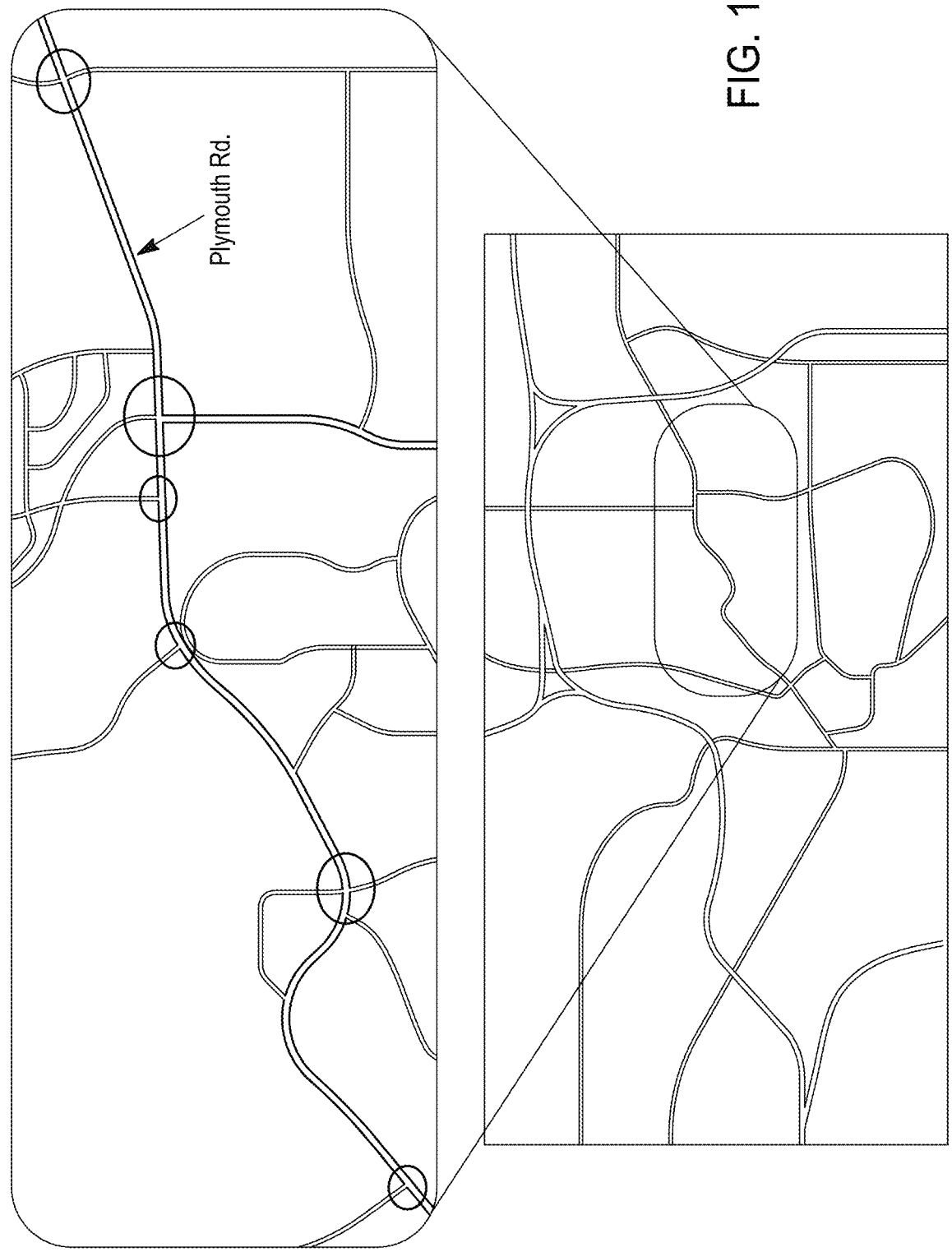
FIG. 1 is a map illustrating a public road corridor for traffic modeling and simulation with six intersections and two lanes in each direction.
Figure 2A:
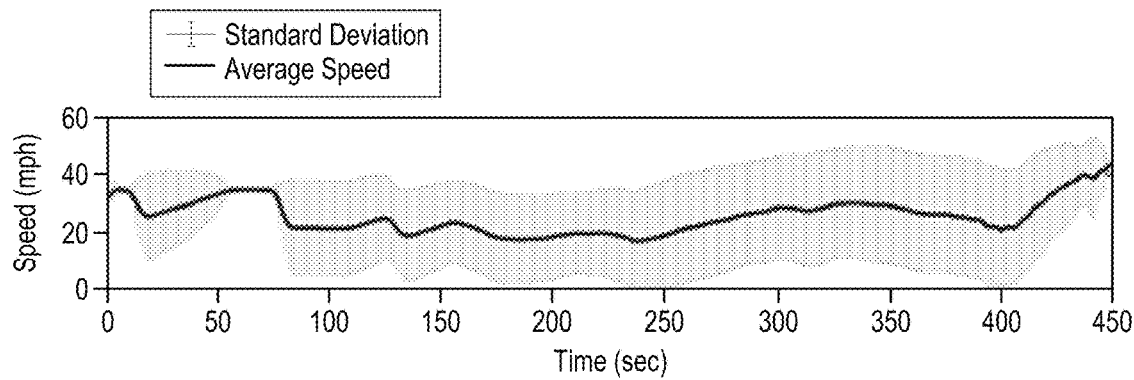
FIGS. 2A-2B illustrate the overall average and standard deviation of the 1531 simulated vehicles over the road corridor, and the average and standard deviation of the "classified" speed profiles in ten bins.
Figure 2B:
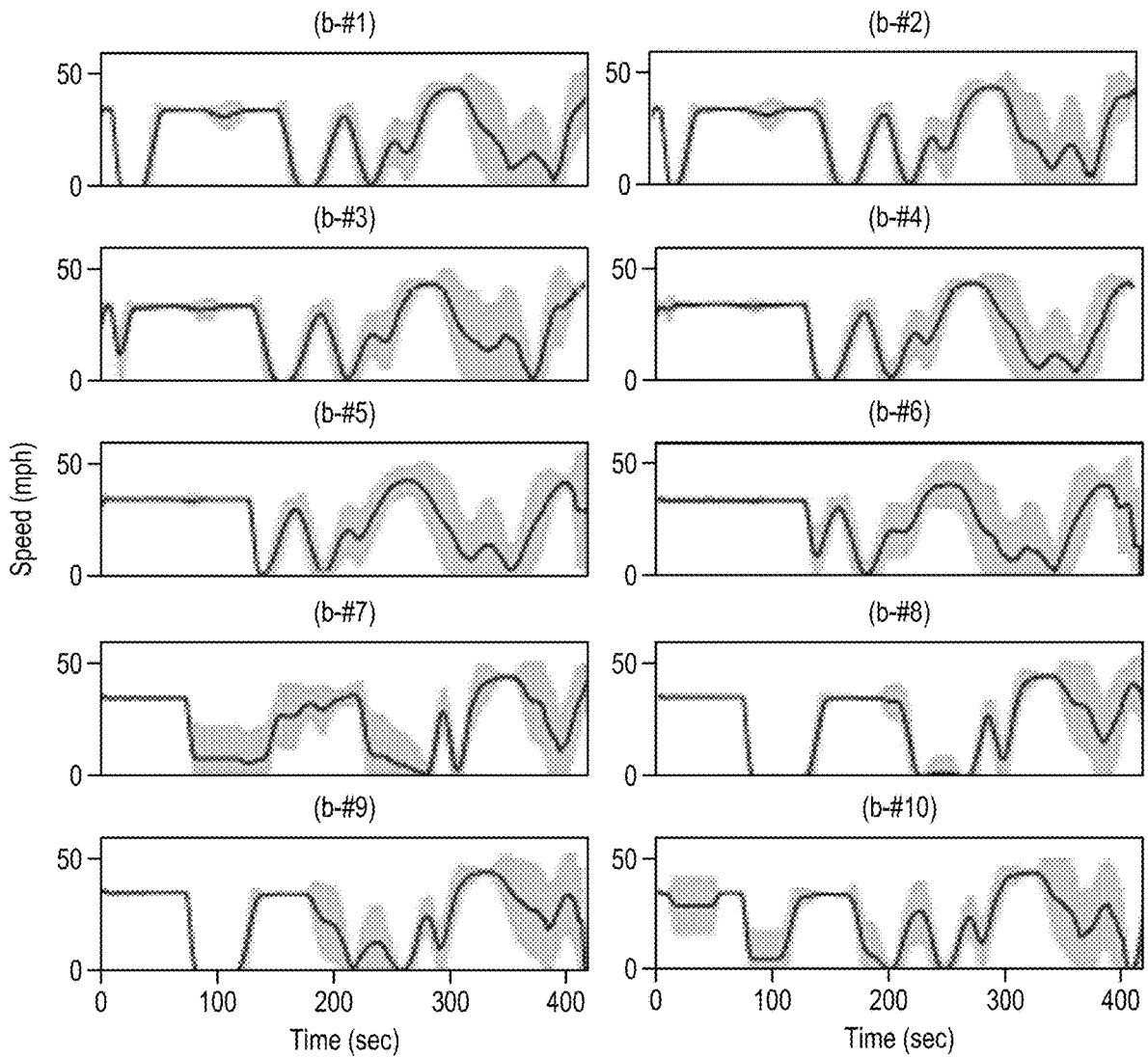

The data-driven speed prediction module 22 received historical traffic data 24 from GPS and connected vehicles database(s), as well as the traffic signal timing data. Based on these data inputs, a data mining algorithm 26 is implemented in the data-driven speed prediction module 22 to classify the historical data into different categories (bins) 30 with relatively similar long-term patterns. The output of the data-driven speed prediction module 22 is a long-term prediction 32 of the vehicle speed (as well as the average traffic flow speed) for all the bin 30s. As an example, for the corridor considered (Plymouth Rd. shown in FIG. 1), since there are ten bins, the output of the data-driven speed prediction module 22 is the speed forecast of ten bins 30, each includes the average speed and standard deviation information as shown in FIG. 2B.

Model-based speed prediction and planning module 11 received the real-time traffic data 12, including the connected vehicle data and traffic signal timing and phasing data. The connected vehicle data are available to the model-based speed prediction and planning module 11 within Dedicated Short-Range Communications (DSRC) range. Inside the model-based speed prediction and planning module 11, a shockwave profile model 14 is implemented and calibrated to estimate the queue length at intersections, and predict the green window needed for eco-trajectory planning. The output 34 of the model-based speed prediction and planning module 11 is a short-range speed prediction (and planning) for eco-driving.

Prediction integration and augmentation module 36 receives the long-term 32 and short-term 34 predictions of vehicle speed from the data-driven speed prediction module 22 and model-based speed prediction and planning module 11, respectively, and integrates them to output a multi-range vehicle speed prediction 38.

Model predictive control module 40 for power and thermal systems received the multi-range vehicle speed forecast 38, based on that it solves a real-time optimization (e.g., Eg. (2)) with an economic cost (i.e., fuel/energy consumption). The objective of the model predictive control module 40 is to minimize energy consumption for the vehicle while enforcing constraints on power and thermal systems, including but not limited to battery state-of-charge, battery temperature, engine coolant temperature, exhaust after treatment system temperature, cabin temperature. The output 42 of this module 40 is control actions optimized to achieve energy-efficient operation of power and thermal systems, which are defined as eco-cooling (when designed for cooling) and eco-heating (when designed for heating).

Finally, the integrated energy management module 44 combines the output 42 of the model predictive control module 40 for eco-cooling/eco-heating with the output 48 of model-based speed prediction and planning module 11 for eco-driving. The output 50 is an optimal energy management strategy aimed at minimizing the vehicle energy consumption through eco-driving (optimizing the vehicle speed with respect to real-time traffic data in short-range) and eco-cooling/eco-heating (optimizing the power and thermal systems of vehicle over multi (short and long) ranges).

The queuing process 16 is modeled based on the shockwave profile model (SPM) 14 to provide a green window for eco-driving trajectory planning. In the present disclosure, the green window is defined as the time interval during which an eco-driving vehicle can pass through a given signalized intersection most efficiently. In some embodiments, the SPM 14 can estimate the queue length 16 after the signal cycle and the vehicles have been already discharged. However, in some embodiments, a modified algorithm is provided that is able to predict the queuing dynamics and estimate the green window before the eco-driving vehicle arrives at the intersection.

Following this modified approach, a six-intersection corridor has been modeled (see FIG. 1), which will be used in the simulations in the remainder of the present disclosure. The stretch of the road represented in the simulations is about 2.2 miles long and has two lanes in each direction. This stretch is one of the busiest local commuting routes. A microscopic traffic simulation software VISSIM was used to build the road network and simulate background traffic. To calibrate the simulation model and represent a congested traffic condition, real-world data were collected during PM rush hour (4:00 PM-5:00 PM), including traffic volume, turning ratio, and traffic signal timing at each intersection. FIG. 1 illustrates the arterial corridor, along with the six considered intersections (red circles). Vehicles in VISSIM software are programmed to broadcast BSMs 18. Additionally, all the traffic signals are programmed to broadcast signal status 20 in real-time. All vehicle and signal data are sent to the queuing profile algorithm for prediction. Finally, the predicted green window is sent to the trajectory-planning algorithm.

The predicted green window specifies a time interval during which the eco-driving vehicle should arrive at the intersection. The vehicle speed trajectory is then generated. The planning horizon of the vehicle speed trajectory starts from the time instant the eco-driving vehicle enters the communication range until it departs from the intersection. In order to ensure a smooth trajectory and reduce energy consumption of the ego-vehicle, a trigonometric speed profile is used which has the following form, $$V_{veh}(t) = \begin{cases} v_p - v_r \cos(mt), & t \in [0, t_p) \\ v_p - v_r \frac{m}{n} \cos\left[n\left(t + \frac{\pi}{2n} - t_p\right)\right], & t \in [t_p, t_q) \\ v_p + v_r \frac{m}{n}, & t \in [t_q, t_{arr}) \end{cases},$$

Where $$v_p = \frac{d_{stop}}{c_{arr}},$$

$v_r = v_p - v_0$, $V_{veh}(t)$ is the vehicle speed at time t, $v_0$ is the initial vehicle speed, $d_{stop}$ is the distance to the stop bar (i.e., to the end of the vehicle queue), $t_{arr}$ is the time of arrival at the intersection given by $t_{arr} = t_g + h$, $t_g$ is the beginning of the green window estimated by the queue length prediction algorithm and h is the saturation headway between two vehicles in seconds. At the time instant $t_p$, the speed of the eco-driving vehicle reaches the average speed $v_p$. After $t_q$, the vehicle speed does not change and the vehicle will cruise to the stop bar. The variables m and n are model parameters calculated based on maximum acceleration, maximum deceleration, and jerk constraints. These parameters determine the shape of the trigonometric profile and are set to reach the cruise segment as soon as possible, subject to the above constraints, as this reduces energy consumption. Note that $[0, t_{arr})$ is the planning window. The trajectory planning ends when the vehicle passes the intersection.

Based on the relationship between the predicted green window, current signal status, and the remaining time, the eco-driving vehicle may choose one of the following four types of speed profiles: "slow down," "speed up," "cruise," or "stop." All speed profiles except for "cruise" are informed by the trigonometric profiles with different parameters while the "cruise" speed profile maintains a constant speed to pass the intersection. In the present disclosure, the minimum cruise speed is set to be 70% of the local speed limit. The planned eco-trajectory is considered as the short-range, model-based, vehicle speed preview.

Traffic Data Mining for Long-Range Speed Predictions

In some previous studies, the extensive coverage of the cellular network, GPS-based position and velocity measurements, and the communication infrastructure of cellphones have been exploited to estimate the traffic flow speed ($V_{flow}$) for energy management of electrified vehicles. While this has shown that traffic flow data can be extracted from a GPS-based traffic monitoring system and be used for long-term vehicle speed predictions for energy management of electrified vehicles, the main focus of these studies is for highway driving. Urban driving scenario with congestion and multiple intersections is not considered. The main challenge in the latter case is that the average GPS-based speed data cannot represent the traffic flow dynamics for the overall urban traffic network.

In order to demonstrate the aforementioned challenge, the same six-intersection corridor shown in FIG. 1, and modeled in VISSIM is recalled. The model is run for four hours, and the trajectories of mixed traffic (1531 vehicles in total, 1481 driven by human, 50 eco-driving) are collected. Note that the penetration rate of eco-vehicles is less than 4%, thereby the overall pattern of the traffic is dominated by the vehicles with human drivers. Additionally, it is assumed that all the simulated vehicles are connected and they can communicate their speed and position data. A coordinated fixed-time signal timing policy with a cycle length of 100 sec at all intersections is considered. FIG. 2A shows the overall average and standard deviation of the aggregated speed profiles of all the simulated vehicles along the corridor. It can be seen that the average speed of the vehicles does not show any specific pattern with respect to the road configurations of intersections. This aggregated average speed, if used for long-range vehicle speed predictions, will result in large errors for MPC-based energy management strategies.

The large variance in the aggregated data suggests that a classification strategy is needed to get more clear patterns in the speed profiles to improve the long-range demand preview for predictive energy management. The traffic signals on arterial corridors dictate the traffic flow with the stop-and-go feature. If the traffic signal information is known, it is possible to classify the trajectories based on the signal timing plans. To this end, a rule-based data classification algorithm (see FIGS. 7-9) is applied to the collected vehicle trajectories. All vehicles are categorized into ten bins 30 based on their arrival time at the first intersection. One signal cycle of 100 sec, which begins with the signal turning red, is divided equally into ten intervals and each interval consists of 10 sec corresponding to one bin. For example, if a vehicle arrives at the intersection 45 seconds after the signal turns to red, the vehicle is classified into bin 5 (i.e., 40-50 sec).

The average and standard deviation of the vehicle speed profiles clustered into these ten bins are shown in FIG. 2B (b-#1 to b #10). Compared to FIG. 2A, FIG. 2B confirms that the signal timing-based classification improves the prediction accuracy significantly. Since the vehicle classification is done only based on the arrival time at the first intersection, the speed variations increase spatially. Note that, while the average speed of the classified vehicles captures the approximate trend of the traffic flow, FIG. 2B shows that the speed variations are different for different bins. FIGS. 3A-3B show the average and standard deviations of the two selected bins (i.e., #8 and #7) from the total ten classified bins. FIG. 3A shows that while the traffic data classification is done only based on the arrival time at the first intersection (shown in FIG. 1), the associated speed variation over the first three minutes of the trip is less than 5 mph. On the other hand, for the second bin (i.e., #7) shown in FIG. 3B, the variation increases after the first intersection.

Case Study: Electric Vehicle Battery Thermal Management

In order to demonstrate the effectiveness of the traffic data mining of the present teachings in improving the efficiency and robustness of MPC-based energy management of CAVs, a battery thermal management (BTM) problem for connected EVs is considered herein. The battery is the only source of power for traction ($P_{trac}$) in EVs, and its efficient thermal management is important for the safe and efficient operation of the battery, as well as the vehicle. EVs have relatively large batteries as compared to hybrid electric vehicles, thus a liquid-based BTM system with higher cooling capacity is often utilized to effectively manage the thermal loads of the battery. The liquid-based BTM system uses the refrigerant of the air conditioning (A/C) loop to reject heat ($\dot{Q}$) from the battery and introduces extra load on the A/C compressor ($P_{BTM}$). The auxiliary power for operating the NC compressor can be up to 2.5 kW from the battery.

Conventional BTM is designed to maintain battery temperature ($T_{bat}$) within the desired range by tracking a constant or variable temperature set point well below the upper-temperature limit. The tracking-based BTM strategy, however, results in a conservative design and reduces the EVs range due to the excessive energy being consumed for BTM purposes. On the other hand, optimization-based BTM solutions with trip "preview" information can maintain the battery temperature within the desired limits (e.g., $T_{bat}^{LL}$-$T_{bat}^{UL}$) efficiently. An economic MPC-based BTM solves the following finite-time (i.e., N) optimization problem:

$$\min_{\dot{Q}(\cdot|k)} \sum_{i=0}^{N} P_{BTM}(i|k), \qquad (2)$$

s.t. $T_{bat}(i+1|k) = f_{T_{bat}}(i|k), i = 0, \ldots, N,$ $SOC(i+1|k) = f_{SOC}(i|k), i = 0, \ldots, N,$ $T_{bat}^{LL} \leq T_{bat}(i|k) \leq T_{bat}^{UL}, i = 0, \ldots, N,$ $-\dot{Q}_{max} \leq \dot{Q}(i|k) \leq 0, i = 0, \ldots, N-1,$ $T_{bat}(0|k) = T_{bat}(k), SOC(0|k) = SOC(k),$ With T being the sampling time, and $R_{bat}$, $U_{oc}$, $C_{nom}$, $C_{th,bat}$, $m_{bat}$ being battery internal resistance, open-circuit voltage, nominal capacity, thermal capacity, and mass, respectively. The optimization problem in Eq. (2) is to minimize the power spent on battery thermal management, $P_{BTM} = a_c \dot{Q}$, over the prediction horizon N, while enforcing the state and input constraints. In Eq. (2), $T_{bat}^{UL}$ and $T_{bat}^{LL}$ are set to 40° C. and 20° C., respectively. Note that $\dot{Q}$ is always non-positive for batter cooling scenario with $a_c$ being constant. The parameters of the battery $T_{bat}$ and SOC models ($f_{T_{bat}}$ and $f_{SOC}$), as well as the vehicle longitudinal dynamic (to compute $P_{trac}$ as a function of the vehicle speed) are adopted from the library of Autonomie software for a light-duty EV.

The optimization problem is solved at every time step, then the horizon is shifted by one step (T), and only the current control is commanded to the system ($\dot{Q}(k)=\dot{Q}(0|k)$). The closed-loop simulations are carried out on a desktop computer, with an Intel Core i7 at 2.60 GHz processor, in MATLAB/SIMULINK using YALMIP for formulating the optimization problem, and IPOPT for solving the optimization problem numerically. The BTM using the MPC in Eq. (2) with speed preview (via $P_{trac}$) is referred to as "Eco-Cooling" in the present disclosure.

Simulation Results

Intuitively, the MPC in Eq. (2) leads the battery temperature to the upper limit $T_{bat}^{UL}$ to reduce the BTM power consumption. Unlike the traction power demand with relatively fast responding dynamics, the battery temperature responds slowly. The slow thermal dynamic of the battery calls for a long prediction horizon so that the MPC (Eq. (2)) can maintain the temperature within the desired limits. Two sample vehicles from bins #8 and #7 are randomly selected, and their normal-driving and eco-driving speed trajectories are shown in FIGS. 3C-3D, respectively. FIGS. 4A-4B shows the results of BTM with the MPC with prediction horizons of N=30 (30 sec with a sampling period of T=1 sec and 180 (180 sec) for these two target vehicles, in which they follow the eco-trajectories (i.e., with eco-driving) shown in FIGS. 3C-3D.

First, we consider the case where the exact speeds are known a priori. FIGS. 4A-4B shows that, while the battery temperature upper limit ($T_{bat}^{UL}$) is enforced for both target vehicles with a long prediction horizon (e.g., N=180), the battery temperature constraint is violated when a short horizon (e.g., N=30) is used, specifically towards the end of the driving cycle. Next, the impact of uncertainty in vehicle speed preview is shown in FIGS. 4C-4D, where the non-clustered speed preview is based on the aggregated speed average as in FIG. 2A, and the clustered ones are based on the average speed of the vehicles in bin #8 and #7. FIGS. 4C-4D shows that an uncertain speed preview can deviate the performance of the BTM controller. It is also observed from FIGS. 4C-4D that a rule-based traffic data mining helps to significantly improve the performance of the MPC-based BTM system with fewer constraint violations. It is noted that even with an improved speed preview through traffic data mining, enforcing the battery temperature constraint over the entire driving cycle cannot be guaranteed. This is because the long-range speed prediction is based on the arrival time at the first intersection; thus, the speed variation increases as the distance of the target vehicle from the first intersection increases.

It was shown in FIGS. 4A-4B that traffic data mining helps significantly improve the robustness of the MPC-based BTM strategy in terms of the battery temperature constraint violation. The energy consumption results of three cases for the two selected target vehicles in bins #7 and #8 are compared in FIGS. 5A-5D. FIGS. 5A-5D shows that with normal BTM cooling (i.e., conventional battery temperature set point tracking), eco-driving reduces the vehicle-level energy consumption by 19.7% and 18.6% for the target vehicles in bin #8 and #7, respectively, as compared to the baseline case with normal driving and normal battery cooling. Note that the eco-driving, even without an optimized BTM, decreases the BTM energy consumption by 12.4% (#8) and 21.2% (#7). Upon applying the eco-cooling strategy, the BTM energy consumption is further reduced by 30.2% (#8) and 37.6% (#7), which are translated to further energy savings results of up to 19.7% (#8) and 18.6% (#7) at the vehicle-level. It is worth noting that these savings are achieved despite the uncertainties in long-range vehicle speed predictions.

Figure 6A:
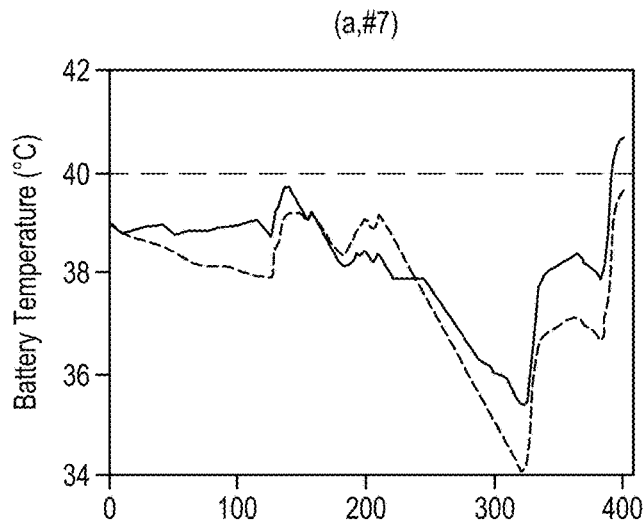
Figure 6B:
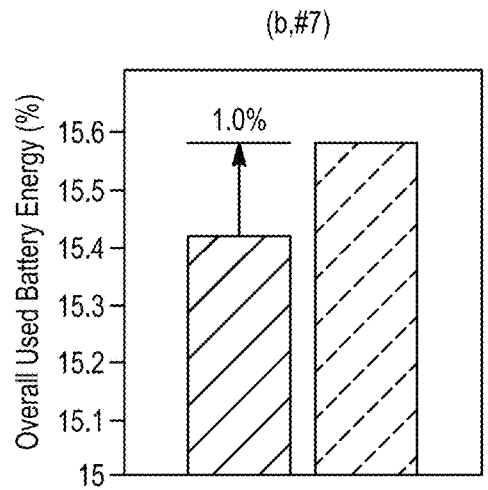
Figure 6C:
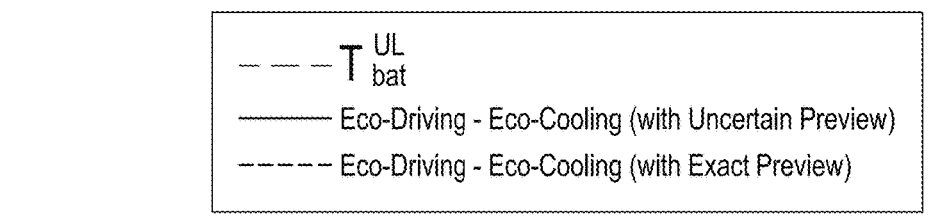
Figure 6C:
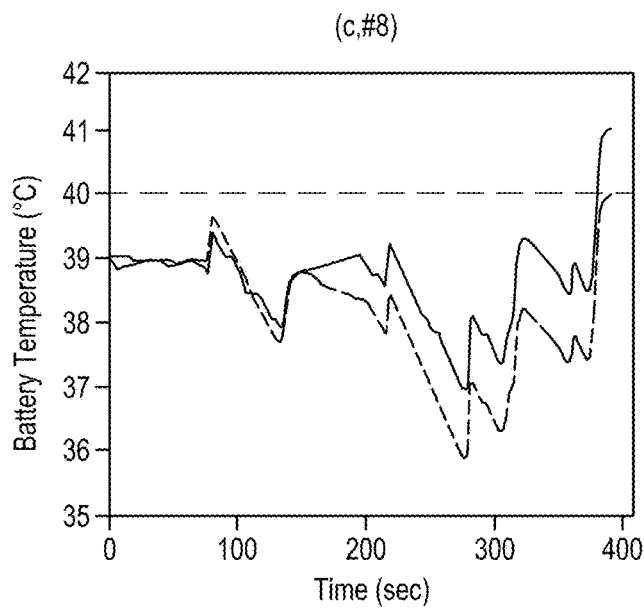
Figure 6D:
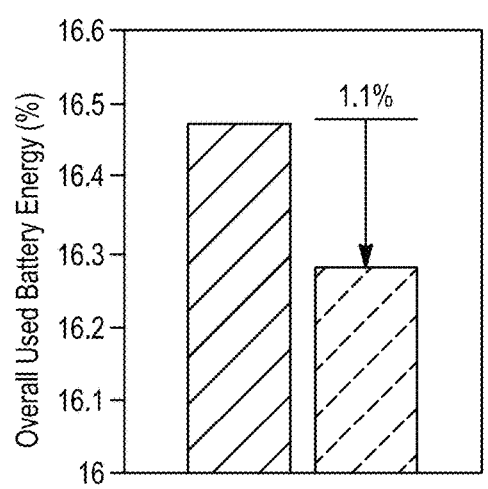

Finally, the MPC-based BTM strategy with long-term uncertain speed preview is compared with the ideal case, where the exact speed preview is known as a priori, and the results are summarized in FIGS. 6A-6D. FIGS. 6A-6D shows that, due to the mismatch between the actual and the estimated speed preview, the performance of the BTM controller varies slightly from the ideal case. While for the target vehicle in bin #7, FIG. 6B shows that the overall energy consumption increases by 1%, for the vehicle in bin #8 (FIG. 6D), with much lower speed variation as shown in FIGS. 3A-3D, the overall consumed energy is decreased by 1.1%.

A data analytic framework for connected and automated vehicles (CAVs), integrated with a V2I-based, model-based speed trajectory planning algorithm, was developed in the present disclosure to provide short- and long-range speed previews for optimization-based energy management of electrified CAVs. Over the short prediction horizon, an eco-trajectory speed planning algorithm is used with consideration of the queuing dynamics at the signalized intersections. Over the long prediction horizon, by leveraging the data collected from an urban traffic network, a big data classification algorithm was developed to mine historical traffic data and predict the vehicle speed. The application of the proposed CAV speed prediction strategy was studied for battery thermal management (BTM) of connected and automated EVs. It was shown that, compared to the baseline EVs with normal-driving, an average energy saving of up to 14% can be achieved through eco-driving. Additionally, the simulation results over real-world urban driving cycles showed that by using the proposed traffic speed prediction scheme, substantial energy can be saved via the "eco-cooling" strategy for BTM of connected EVs, as compared to more traditional energy management techniques without consideration of vehicle speed preview.

It is anticipated that the present teachings can be modified to focus on enhancing the data mining algorithm accuracy in speed prediction, which currently is formulated based on the arrival times at the first intersection of the considered arterial corridor. To this end, advanced spatiotemporal data analytic algorithms can be adopted to take into account the randomness of the traffic data in a highly stochastic urban driving environment with different penetration rates of CAVs. The application of the present teachings is further applicable for more complex power and thermal management of the CAVs, with consideration of the combustion engine and cabin thermal management.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system for multi-range vehicle speed prediction along a travel corridor having a plurality of intersections for enhanced energy management of a vehicle, the system comprising:

a data-driven prediction module configured to receive historic traffic data from at least one of GPS, a connected vehicle database, and traffic signal timing data along the travel corridor for long-term vehicle speed prediction, organize the historic traffic data into a plurality of bins, and determine and output long-range speed predictions;

a model-based speed prediction and planning module configured to receive real-time traffic data including connected vehicle data and traffic signal timing and phasing data, estimate queuing dynamics at signalized intersections along the travel corridor using a shockwave profile model to estimate a queue length at each of the plurality of intersections for eco-trajectory planning, and output a short-range speed prediction;

an integration module configured to integrate the short-range and long-range speed predictions to output a multi-range speed forecast; and a control module configured to solve a real-time optimization to minimize energy consumption of the vehicle while simultaneously enforcing power and thermal system constraints and output a model predictive control (MPC) signal to the vehicle and associated control actions in response to the multi-range speed forecast for predictive controlling of an operation of the vehicle power and thermal systems.

2. The system according to claim 1, further comprising an integrated energy management module configured to optimize the energy management of the vehicle through at least one of eco-driving and eco-cooling or eco-heating.

3. The system according to claim 2 wherein eco-driving comprises optimizing the vehicle speed with respect to real-time traffic data in short-range.

4. The system according to claim 2 wherein eco-cooling or eco-heating comprises optimizing the power and thermal systems of the vehicle over multiple short- and long-ranges.

5. A method of simultaneous management of power and thermal systems of connected and automated vehicles for enhanced energy management of a vehicle, the method comprising:

receiving historic traffic data for long-term prediction;

receiving real-time vehicle to infrastructure (V2I) information using a communication system for queuing dynamics estimation and prediction for eco-trajectory planning and eco-driving; and predicting a speed trajectory of a connected and automated vehicle based on the historical traffic data and real-time V2I information and outputting a model predictive control (MPC) signal responsive thereto to the vehicle power and thermal systems.

* * * * *